United States Patent
Wörz

(10) Patent No.: US 8,905,222 B2
(45) Date of Patent: Dec. 9, 2014

(54) METHOD FOR PICKER LINE AND PACKAGING PLANT

(71) Applicant: Multivac Sepp Haggenmüller GmbH & Co. KG, Wolfertschwenden (DE)

(72) Inventor: Norbert Wörz, Erkheim (DE)

(73) Assignee: Multivac Sepp Haggenmueller GmbH & Co. KG, Wolfertschwenden (DE)

( * ) Notice: Subject to any disclaimer, the term of this patent is extended or adjusted under 35 U.S.C. 154(b) by 0 days.

(21) Appl. No.: 13/906,022

(22) Filed: May 30, 2013

(65) Prior Publication Data
US 2013/0319818 A1    Dec. 5, 2013

(30) Foreign Application Priority Data
May 31, 2012    (DE) .......................... 10 2012 010 844

(51) Int. Cl.
| | | |
|---|---|---|
| *B65G 15/22* | (2006.01) | |
| *B65G 47/90* | (2006.01) | |
| *B65B 5/10* | (2006.01) | |
| *B65B 35/24* | (2006.01) | |
| *B65G 47/26* | (2006.01) | |
| *B65B 57/14* | (2006.01) | |
| *B65G 47/31* | (2006.01) | |

(52) U.S. Cl.
CPC .............. *B65G 47/268* (2013.01); *B65G 47/31* (2013.01); *B65B 35/24* (2013.01); *B65B 5/105* (2013.01); *B65G 47/905* (2013.01); *B65B 57/14* (2013.01)
USPC ....................... 198/460.1; 198/440; 198/461.1

(58) Field of Classification Search
USPC .............. 198/426, 431, 436, 437, 440, 460.1, 198/461.1; 53/247, 249, 251
See application file for complete search history.

(56) References Cited

U.S. PATENT DOCUMENTS

| | | | | |
|---|---|---|---|---|
| 3,225,891 A | * | 12/1965 | Hickin et al. ................. | 198/429 |
| 5,009,053 A | * | 4/1991 | Langenbeck et al. .............. | 53/58 |
| 5,501,064 A | * | 3/1996 | Ingram et al. ................... | 53/473 |
| 5,829,222 A | * | 11/1998 | Schlagel et al. .................. | 53/54 |
| 6,122,895 A | * | 9/2000 | Schubert .......................... | 53/55 |
| 6,520,317 B2 | * | 2/2003 | Sherwin ........................ | 198/438 |
| 6,546,971 B1 | * | 4/2003 | Wild et al. ..................... | 141/145 |
| 6,711,880 B2 | * | 3/2004 | Wipf et al. ...................... | 53/450 |
| 6,853,876 B2 | * | 2/2005 | Wehrung et al. .............. | 700/230 |
| 6,901,726 B2 | * | 6/2005 | Huppi et al. ..................... | 53/473 |
| 7,168,552 B2 | * | 1/2007 | Katayama ................... | 198/460.1 |
| 8,087,509 B2 | * | 1/2012 | Schmid .......................... | 198/444 |
| 8,393,132 B2 | * | 3/2013 | Waeckerlin ..................... | 53/458 |
| 8,490,775 B2 | * | 7/2013 | Volk et al. .................... | 198/419.3 |
| 8,549,818 B2 | * | 10/2013 | Ehrat et al. ...................... | 53/237 |

FOREIGN PATENT DOCUMENTS

| | | |
|---|---|---|
| DE | 19752908 A1 | 6/1999 |
| DE | 102007028680 A1 | 12/2008 |
| EP | 0856465 A1 | 8/1998 |
| EP | 1352831 A1 | 10/2003 |
| EP | 2184233 A2 | 5/2010 |
| EP | 2586712 A1 | 5/2013 |

\* cited by examiner

*Primary Examiner* — Douglas Hess
(74) *Attorney, Agent, or Firm* — Husch Blackwell LLP

(57) ABSTRACT

The invention relates to a packaging plant and a method of operating a picker line for feeding products into packaging troughs of a packaging machine, comprising a first feed belt and a second feed belt, the speed of the second feed belt being reduced relative to the speed of the first feed belt so as to buffer the products which have not been gripped by the first picker and allow the last picker to grip all the products and to feed them in.

12 Claims, 3 Drawing Sheets

METHOD FOR PICKER LINE AND PACKAGING PLANT

CROSS-REFERENCE TO RELATED APPLICATIONS

This Application claims priority to German Application Number 102012010844.3 filed May 31, 2012, to Norbert Wörz entitled "Method for Picker Line and Packaging Plant," currently pending, the entire disclosure of which is incorporated herein by reference.

FIELD OF THE INVENTION

The invention relates to a method for operating a picker line for feeding in products, which are supplied on feed belts moving in the same direction to a packaging machine, where they are gripped by pickers and placed into packaging troughs, and to a packaging plant.

BACKGROUND OF THE INVENTION

Picker lines comprising a plurality of pickers at packaging machines (e.g. thermoform packaging machines) are known in practice. The products to be fed in are here supplied on a feed belt parallel to the infeed line of the thermoform packaging machine, the conveying direction of the products corresponding to the conveying direction of the thermoform packaging machine (i.e., the products are supplied in the same direction). Before the products arrive in the picker area, they are optically detected by a vision system so as to detect the position and the orientation of each individual product and transmit this information to the control unit. The individual pickers receive the information on the position of the individual products on the feed belt via the control unit or directly from the vision system. Via a predetermined logic, the pickers pick up the products from the feed belt and place them into packaging troughs in the thermoform packaging machine. The aim to be achieved is that, at the end of the feed belt or after the last picker, all products have been picked up and fed in and that all packaging troughs will be filled before they are sealed with a cover film in a sealing station downstream of the infeed line. When feeding takes place in the same direction, the last picker must finally achieve this aim alone.

The following problem may here arise: only a small number of products, which may be spaced apart at large distances, are available on the feed belt for the last picker and a significantly higher number of troughs that are still to be filled may be located in said picker's infeed area. In this case it is impossible to fill all the troughs or packages with products. In order to avoid this problem in practice, more products than necessary are normally supplied on the feed belt so that the last picker will always have a sufficient number of products at its disposal for allowing a 100% of the packaging troughs to be filled. Surplus products are discharged at the end of the feed belt and resupplied to the feed belt by hand or via an additional feed belt in the area upstream of the picker line.

SUMMARY OF THE INVENTION

It is the object of the present invention to provide a method for a picker line for minimizing the number of surplus products which cannot be picked up by the last picker of a picker line.

The method of operating a picker line for feeding products into a packaging machine comprises at least two pickers, a first feed belt and a first vision system, the first picker being arranged downstream of the first vision system and being associated with the first feed belt, and a second vision system as well as a second feed belt being provided downstream of the first feed belt, and the last picker being associated with the second feed belt and arranged downstream of the second vision system. The speed of the second feed belt may be reduced in comparison with the speed of the first feed belt so as to reduce the distances between the products that have not been gripped by the first picker and so as to transmit the positions of the products by means of the second vision system to the last picker. The two independently controllable and successively arranged feed belts have the effect that the products provided for the last picker are buffered on the second feed belt, and the reduced speed of the second feed belt in comparison with the speed of the first feed belt has the effect that the products are conveyed at a sufficiently low speed in the area of the last picker. The last picker can thus grip all the products and place them into still empty packaging troughs and, consequently, the total amount of products to be supplied can correspond to the performance of the packaging machine and the pickers. Refeeding products that have not been gripped to a location upstream of the feed belts is no longer necessary.

In one embodiment, at least two first pickers grip products from the first feed belt, if the amount of products to be fed in within a predetermined time should necessitate this.

According to one embodiment, the speed reduction amounts to more than 25%, preferably more than 50%.

The second vision system may also detect the orientation of the products and transmit this information to the last picker so that also products which have to be fed in at a specific angle can be detected or curved products, such as sausages, can be detected in a reliable manner A packaging plant according to one embodiment of the present invention comprises a packaging machine and a picker line arranged along the packaging machine and including at least two pickers, as well as a first vision system for a first feed belt, said packaging plant being characterized in that a second feed belt is provided along the packaging machine in the conveying direction, and that a second vision system is arranged at the second feed belt, the speed of the second feed belt being adapted to be reduced relative to the speed of the first feed belt so that the distances between the products which have not been gripped by the first picker can be reduced and the positions of the products can be transmitted to the last picker by means of the second vision system.

The picker lines and the packaging machine can be arranged such that they operate in the same direction. The direction of production can thus be maintained.

The packaging machine can comprise a plurality of tracks with packaging troughs, so that a high performance of the machine can be accomplished.

According to one embodiment, the first and the second feed belt are arranged along the infeed line of the packaging machine.

The first and the second feed belt can each have a drive unit of their own, so that they can be operated at speeds which differ from one another.

The pickers may be delta robots, so that the products can be gripped from different positions from the feed belt and inserted into empty packaging troughs in a flexible manner.

According to one embodiment, the second vision system is configured such that it is able to detect also the orientation of the products and to transmit this information to the last picker, since, after the transfer to the second feed belt, the position and/or the orientation of the products may have changed in comparison with that which has been detected by the first vision system.

Other and further objects of the invention, together with the features of novelty appurtenant thereto, will appear in the course of the following description.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

Identical components are designated by identical reference numerals throughout the figures.

DETAILED DESCRIPTION OF THE INVENTION

Figure 1:
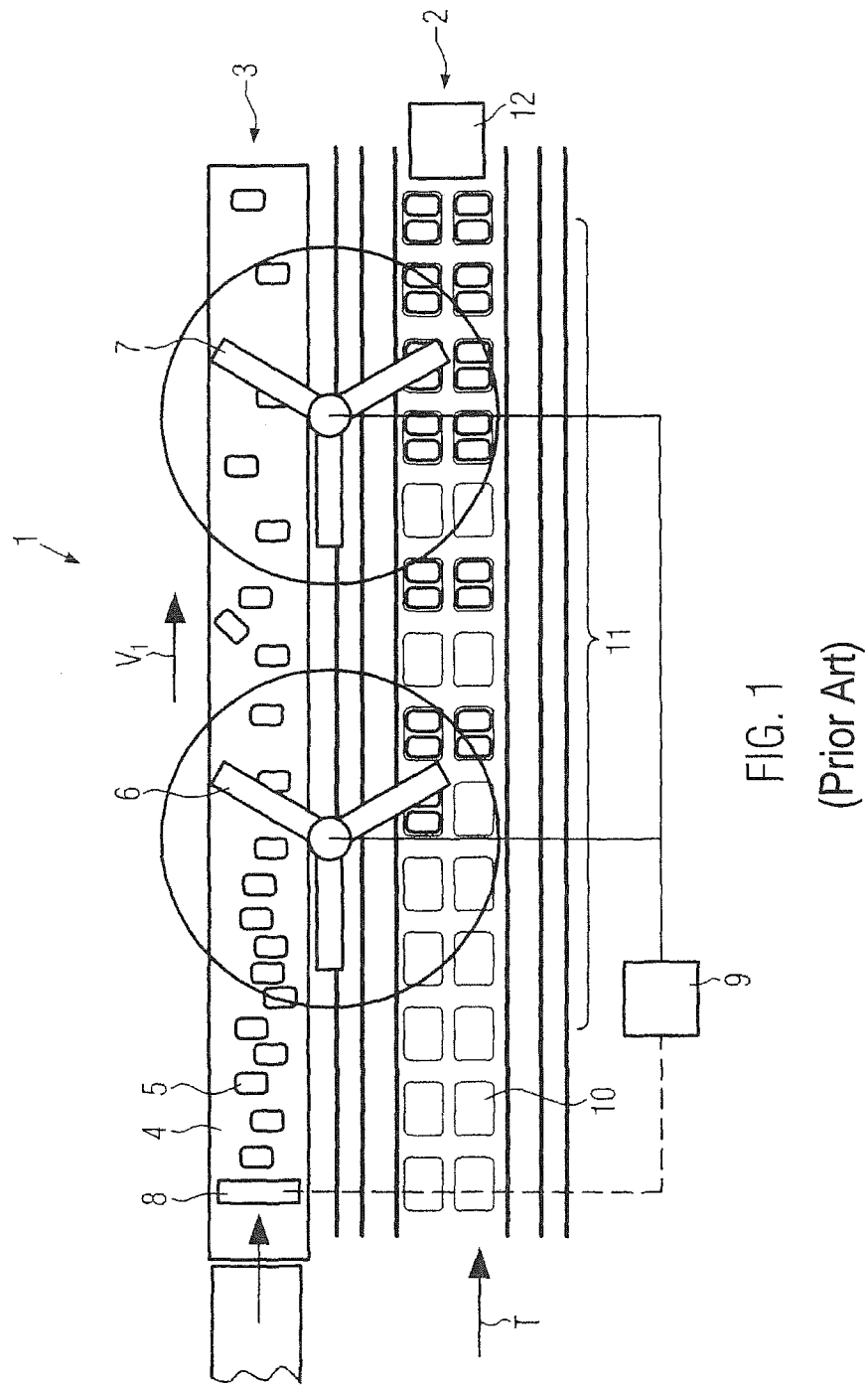
FIG. 1 is a schematic top view illustrating a packaging plant with a picker line according to the prior art.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a packaging plant 1 according to the prior art. A packaging machine 2 in the form of a thermoform packaging machine and a picker line 3 are arranged parallel to one another such that they operate in an identical conveying direction T. The products 5 are fed to a first picker 6 and a second picker 7 via a feed belt 4. A vision system 8 detects the position and the orientation of the products 5 at the beginning of the feed belt 4 and transmits this information to a picker control unit 9 or to the pickers 6, 7 directly. The packaging machine 2 provides thermoformed packaging troughs 10 for the products 5 to be fed in (i.e. to be loaded into the troughs), so that these packaging troughs 10 can be filled with products 5 by the pickers 6, 7 in the infeed area (or loading area) 11. Subsequently, the packaging troughs 10 are closed with a cover film/foil, which is not shown, in a sealing station 12 so as to form an air-tight package.

The method is described as follows: the feed belt runs at a constant speed v1 and supplies a sufficient amount of products 5 to the pickers 6, 7, so that the pickers 6, 7 can place the products 5 into empty packaging troughs 10, which have to be filled within a predetermined period of time. In so doing, the first picker 6 removes half of the products to be fed in from the feed belt 4, and places them into the packaging troughs 10. Hence, products 5 located at larger distances from one another or separated by differently sized gaps from one another are positioned on the feed belt 4 in the area of the second picker 7, so that the performance of the second picker 7 will often not suffice for completely filling all the packaging troughs 10 which have not yet been filled. In order to counteract this problem, more products 5 than necessary are supplied so as to provide a sufficient amount of products 5 also for the second picker 7 within its range of action. This has inevitably the effect that a few products 5 that have not been gripped must be collected at the end of the feed belt 4 and re-supplied to the system upstream of the feed belt 4. Another problem may arise when, upon gripping a product, the first picker 6 touches a neighboring product such that its position or orientation is changed so that it can then no longer be gripped by the second picker 7.

Figure 2:
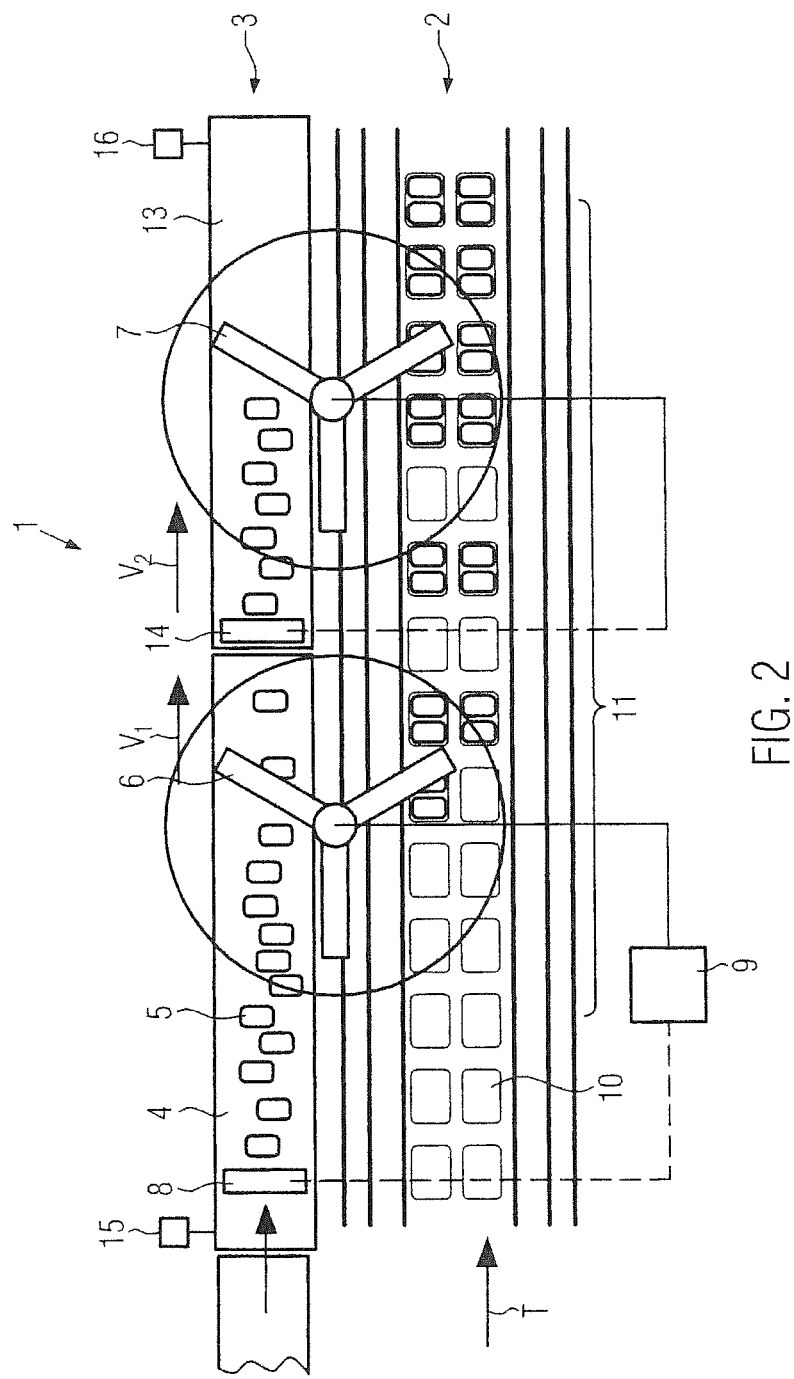
FIG. 2 is a schematic top view illustrating a packaging plant with a picker line according to one embodiment of the present invention.

FIG. 2 shows a picker line 3 according to one embodiment of the present invention, comprising a first picker 6 and a second picker 7 as well as a first feed belt 4 with a first vision system 8 for the first picker 6 as well as a second feed belt 13 with a second vision system 14 for the second picker 7, said second vision system 14 being arranged at the beginning of the second feed belt 13 when seen in the conveying direction T. The first feed belt 4 is provided with a drive unit 15 and conveys the products with a first speed v1, said first speed v1 being preferably constant or proportional to the performance of the packaging machine 2 or adjustable in accordance with the amount of products 5 supplied. The second feed belt 13 is provided with a second drive unit 16 so as to allow said feed belt 13 to be moved at a constant speed v2, which can be lower than the speed v1, or so as to allow a change of the speed v2 in response to the products 5 detected by means of the vision system 14 for adapting the distances between the products such that these distances will be so small that the second feed belt 13 can be moved at a speed that is slow enough for the second picker 7 to grip and feed in all the products 5. The second feed belt 13 can thus buffer the products 5 which have not been gripped by the first picker 6 and reduce the gaps between the products after the first picker 6, whereby the products 5 can be supplied at a lower speed v2 in the area of the second picker 7.

It is thus possible to guarantee, with an unchanged number of pickers 6, 7 and an unchanged length of the infeed line 11, that all packaging troughs 10 can be filled and all products 5 can be gripped by the second picker 7.

Figure 3:
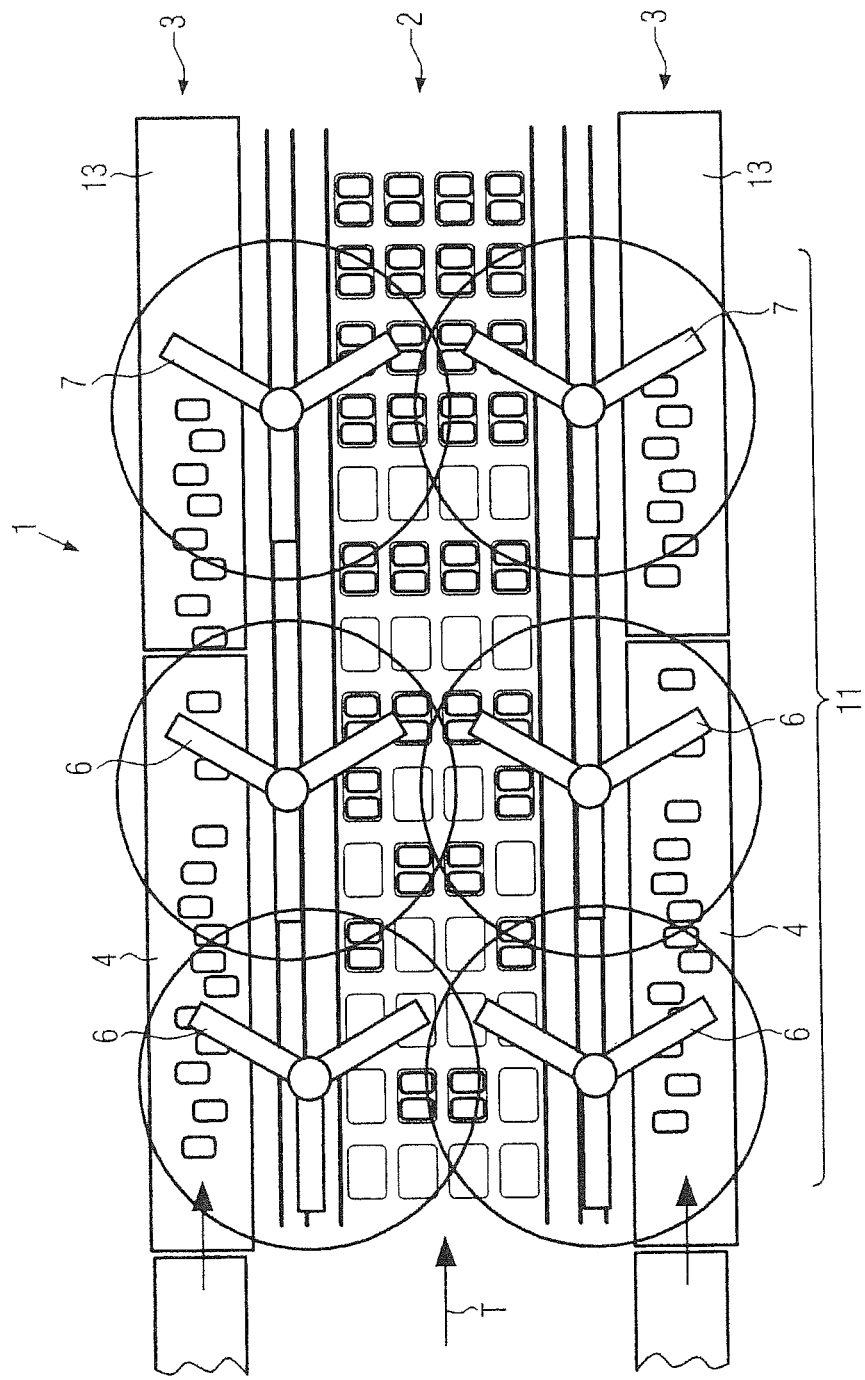
FIG. 3 is a schematic top view illustrating a packaging plant with two picker lines according to another embodiment of the present invention.

FIG. 3 shows another embodiment of a packaging plant 1 with two picker lines 3 at a four-track packaging machine 2, where the feed belts 4, 13 and the pickers 6, 7 are arranged on either side of the packaging machine 2 along the infeed line 11 such that they operate in the same direction, and two pickers 6 are provided for each first feed belt 4.

Likewise, also more than two pickers 6 are imaginable for the first feed belt 4 or more than two feed belts 13 are imaginable per picker line 3, the speed of the ultimate feed belt being then lower than the speed of the penultimate feed belt.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of operating a picker line for feeding into a packaging machine, the method comprising the steps of: providing a packaging plant including:
   a first feed belt, a first vision system and at least one first picker being arranged downstream of the first vision system;
   a second feed belt arranged downstream of the first feed belt, a second vision system and a last picker arranged downstream of the second vision system;
   reducing a speed of the second feed belt in comparison with a speed of the first feed belt so as to reduce the distances between the products that have not been gripped by the at least one first picker and so as to transmit the positions of the products by means of the second vision system to the last picker.

2. A method according to claim 1, wherein at least two first pickers grip products from the first feed belt.

3. A method according to claim 1, wherein the reduction of the speed from the first feed belt to the second feed belt amounts to more than 25%.

4. A method according to claim 1, wherein the second vision system detects an orientation of the products and transmits orientation information to the last picker.

5. A packaging plant for packaging product, said packaging plant comprising:
   a packaging machine;
   a picker line arranged along the packaging machine;
   at least two pickers;
   a first feed belt having a first vision system;
   a second feed belt having a second visions system, wherein the second feed belt is provided downstream of the first feed belt;
   wherein a speed of the second feed belt is adapted to be reduced relative to a speed of the first feed belt so that the distances between products which have not been gripped by a first said picker can be reduced and the positions of such products can be transmitted to a last said picker by means of the second vision system.

6. A packaging plant according to claim 5, wherein at least two pickers are associated with the first feed belt.

7. A packaging plant according to claim 5, wherein the picker line and the packaging machine are arranged such that they operate in the same direction.

8. A packaging plant according to claim 5, wherein the packaging machine comprises a plurality of tracks with packaging troughs.

9. A packaging plant according to claim 5, wherein the first feed belt and the second feed belt are arranged along an infeed line of the packaging machine.

10. A packaging plant according to claim 5, wherein the first feed belt and the second feed belt each have a drive unit of their own.

11. A packaging plant according to claim 5, wherein the pickers are delta robots.

12. A packaging plant according to claim 5, wherein the second vision system is configured such that it is able to detect also orientation of the products and to transmit orientation information to a last said picker.

* * * * *